(12) United States Patent
Feng et al.

(10) Patent No.: US 8,111,319 B2
(45) Date of Patent: *Feb. 7, 2012

(54) IMAGING SYSTEM USING ENHANCED SPHERICAL ABERRATION AND SPECIFICALLY SIZED FIR FILTERS

(75) Inventors: Guotong Feng, Mountain View, CA (US); M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 303 days.

This patent is subject to a terminal disclaimer.

(21) Appl. No.: 12/355,625

(22) Filed: Jan. 16, 2009

(65) Prior Publication Data

US 2010/0182476 A1    Jul. 22, 2010

(51) Int. Cl.
*H04N 5/225* (2006.01)
(52) U.S. Cl. ........................................................ 348/335
(58) Field of Classification Search ................... None
See application file for complete search history.

(56) References Cited

U.S. PATENT DOCUMENTS

| | | | |
|---|---|---|---|
| 5,468,950 A | 11/1995 | Hanson | |
| 5,748,371 A | 5/1998 | Cathey, Jr. et al. | |
| 7,177,085 B2 * | 2/2007 | Tocci et al. | 359/639 |
| 7,224,540 B2 | 5/2007 | Olmstead et al. | |
| 7,336,430 B2 | 2/2008 | George et al. | |
| 2010/0013966 A1 * | 1/2010 | Feng et al. | 348/273 |
| 2010/0188552 A1 * | 7/2010 | Feng et al. | 348/340 |

OTHER PUBLICATIONS

Dowski et al., "Extended Depth of Field Through Wavefront Coding," Applied Optices, 1995, pp. 1859-1866, vol. 34, No. 11.
George, N. et al., "Extended Depth of Field Using a Logarithmic Asphere," Journal of Optics A: Pure Applied Optics, 2003, pp. S157-S163.
Mouroulis, P., "Depth of Field Extension with Spherical Optics," Aug. 18, 2008, Optics Express, pp. 12995-13004, vol. 16, No. 17.
U.S. Appl. No. 11/155,870, filed Jun. 17, 2005, Issued as U.S. Patent No. 7,616,841, Robinson et al.
U.S. Appl. No. 12/215,742, filed Jun. 27, 2008, Published as 2009/0322928 A1, Robinson et al.
U.S. Appl. No. 11/768,009, filed Jun. 25, 2007, Published as 2008/0316609 A1, Robinson.
U.S. Appl. No. 11/866,860, filed Oct. 3, 2007, Published as 2009/0091797 A1, Robinson.
U.S. Appl. No. 11/999,101, filed Dec. 3, 2007, Published as 2009/0141140 A1, Robinson.

* cited by examiner

*Primary Examiner* — Luong T Nguyen
(74) *Attorney, Agent, or Firm* — Fenwick & West LLP

(57) ABSTRACT

A class of imaging systems in which the imaging optics, the sensor array and the image processing are related by three parameters: $W_{040}$ the amount of third order spherical aberration, U the undersampling factor defined as the ratio of the Nyquist frequency of the sensor array divided by the diffraction-limited frequency of the imaging optics, and N the number of rows in the FIR implementation of the image processing. In one aspect, $W_{040}$ is between approximately 2 and 8 waves, U is between approximately 0.05 and 0.30, and N satisfies an equation that defines the acceptable range of N as a function solely of $W_{040}$ and U.

20 Claims, 4 Drawing Sheets

IMAGING SYSTEM USING ENHANCED SPHERICAL ABERRATION AND SPECIFICALLY SIZED FIR FILTERS

BACKGROUND OF THE INVENTION

1. Field of the Invention

This invention relates to imaging systems in which specifically aberrated optics are balanced by specific digital image processing.

2. Description of the Related Art

Electro-optic imaging systems typically include imaging optics (e.g., a lens or mirror assembly), an electronic sensor array (e.g., CCD detector array) and a digital image processor (e.g., typically implemented in dedicated chips or software). Traditional methods for designing these systems generally involve fairly independent steps. The optics typically is designed with the goal of forming a high quality intermediate optical image at the sensor array. The sensor array often is dictated by the intended application, including resolution and cost factors. The digital image processing typically is designed after the optics, with the goal of compensating for remaining defects in the sampled intermediate optical image.

The design stages typically occur with very little coordination between the optical designer and the image processing designer. The separation of these stages is a reflection of the significant differences between the fields of optics and image processing in their methods, tools, goals and constraints. For example, each field covers a large swath of potential applications but there typically is little overlap between the two fields other than the design of electro-optic imaging systems. The design of conventional microscopes, telescopes, eyeglasses, etc. typically does not consider any significant image processing. Likewise, areas of image processing such as compression, computer graphics, and image enhancement typically do not involve any significant optics. As a result, each field has evolved independent of the other and with its own unique terminology, best practices, and set of tools. In general, the familiarity required to master each of these domains hinders a unified perspective to designing electro-optic imaging systems.

One drawback to the traditional design approach is that synergies between the optics and the digital image processing subsystem may be overlooked. The optical designer creates the "best" optical subsystem without knowledge of the digital image processing subsystem. The image processing designer creates the "best" digital image processing subsystem without the ability to modify the previously designed optical subsystem. These subsystems are then "glued" together to form the electro-optic imaging system. The concatenation of two independently designed "best" subsystems may not yield the "best" overall system. There may be unwanted interactions between the two independently designed subsystems and potential synergies between the two subsystems may go unrealized.

There has been recent interest in taking advantage of these synergies. For example, U.S. patent application Ser. No. 11/155,870 "End-To-End Design of Electro-Optic Imaging Systems" to Robinson and Stork concerns a general approach to designing an imaging system by allowing the imaging optics and image processing to compensate each other. Thus, while neither the optics nor the image processing may be optimal when considered alone, the interaction of the two produces good results. Put in another way, in order to achieve a certain overall image quality, this approach allows the use of lower quality optics and/or lower quality image processing so long as the two compensate each other to achieve the desired performance.

However, this is a design problem with a very large degree of freedom. In the traditional approach, the separate design of the optics alone is a difficult problem with a large possible design space and it takes professional optical designers many years to master the task of selecting good designs within this design space. Similarly, the subsequent design of the image processing is also a large possible design space and it also takes professionals in that field many years to master their art. In the combined approach, the optics and image processing are designed together, thus the total possible design space includes both the optics design space and the image processing design space, thus compounding the complexity of the design problem.

As a result, the designs to date that are based on some interplay between the optics and the image processing typically are either fairly specific designs or designs that take advantage of a narrow characteristic (i.e., not exploring the entire design space). For example, U.S. patent application Ser. No. 12/215,742 "Electro-Optic Imaging System With Aberrated Triplet Lens Compensated By Digital Image Processing" to Robinson and Stork presents various designs, most if not all of which are specific triplet designs. U.S. patent application Ser. No. 11/768,009 "Compact Super Wide-Angle Imaging System" to Robinson presents various designs, most if not all of which are targeted for fisheye imaging applications. U.S. patent application Ser. No. 11/866,860 "Catadioptric Imaging System" to Robinson presents various designs, but for a specific class of catadioptric system.

Similarly, there have also been attempts to trade off or take advantage of specific optical characteristics. For example, U.S. application Ser. No. 11/999,101 "End-to-End Design Of Electro-Optic Imaging Systems For Color-Correlated Objects" to Robinson takes advantage of color correlation when imaging color-correlated objects. U.S. Pat. No. 7,224,540 "Extended depth of field imaging system using chromatic aberration" to Olmstead et al. and U.S. Pat. No. 5,468,950 "Chromatic ranging method and apparatus for reading optically readable information over a substantial range of distances" to Hanson also take advantage of color correlation, but for objects where different color images are perfectly correlated. U.S. Pat. No. 5,748,371 "Extended depth of field optical systems" to Cathey, Jr. et al. uses a different approach based on introducing a phase mask, but also for color-correlated objects.

Another class of designs concerns extending the depth of field for an imaging system by introducing other types of aberrations or optical effects that, when acting in conjunction with subsequent image processing, will compensate for depth of field. For example, Dowski and Cathey, "Extended Depth of Field through Wavefront Coding," *Applied Optics* 41:1859-1866, 1995, inserts an additional phase plate in order to increase the depth of field. As another example, George and Chi, "Extended Depth of Field Using a Logarithmic Asphere," *Journal of Optics A: Pure Applied Optics* 5(5):S157-S163, 2003, uses a special aspheric element to increase the depth of field. U.S. Pat. No. 7,336,430 "Extended Depth of Field Using a Multi-Focal Length Lens with a Controlled Range of Spherical Aberration and a Centrally Obscured Aperture" to George and Chi introduces a central obscuration and spherical aberration to increase the depth of field. Mouroulis, "Depth of Field Extension with Spherical Optics," *Optics Express* 16(17):12995-13004, 2008, concerns extending the depth of field by using spherical aberration.

Most, if not all, of the above designs are either specific designs or dependent upon a specific approach or optical characteristic. In addition, many of the above approaches require the use of expensive optical elements (e.g., the introduction of additional phase plates, pupil masks, or other elements or the use of aspheres or other more complex optics) and/or complicated image processing (e.g., iterative deconvolution or ideal Wiener filters).

Thus, there is a need for approaches that are broader in nature (i.e., potentially covering a wider range of applications and imaging systems). These approaches preferably use simple optics and simple digital filtering, while also simplifying the design task (i.e., limiting the design space).

SUMMARY OF THE INVENTION

The present invention overcomes the limitations of the prior art by providing a class of imaging systems in which the imaging optics, the sensor array and the image processing are related by three parameters: $W_{040}$ the amount of third order spherical aberration, U the undersampling factor defined as the ratio of the Nyquist frequency of the sensor array divided by the diffraction-limited frequency of the imaging optics, and N the number of rows in the FIR implementation of the image processing. In one aspect, $W_{040}$ is between approximately 2 and 8 waves, U is between approximately 0.05 and 0.30, and N satisfies an equation that defines the acceptable range of N as a function solely of $W_{040}$ and U. Other aspects of the invention include methods corresponding to the systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
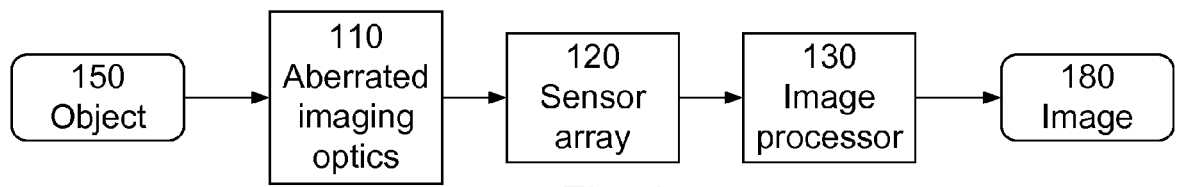
FIG. 1 is a block diagram of a digital-optical imaging system according to the invention.

FIG. 1 is a block diagram of a digital-optical imaging system according to the invention. The imaging system includes imaging optics 110 (e.g., a lens assembly), sensor array 120 (e.g., CCD detector array) and image processor 130 (e.g., typically implemented in dedicated chips or software). The imaging system produces a digital image 180 of an object 150. It is a "digital-optical" imaging system in the sense that optics 110 are used to produce an image on the sensor array 120, and the captured image is digitally processed by the image processor 130.

Various aspects of the invention are especially beneficial for imaging systems used in consumer devices, for example a cell phone camera or digital camera. Many of these consumer applications operate primarily (or even exclusively) in the visible wavelength region, at F/#'s between approximately F/2 and F/6, and over fields of view up to about 60 degrees full field. The corresponding sensor arrays 120 often have pixel pitches (i.e., pixel to pixel spacing) of approximately 2 μm to 9 μm.

One useful parameter that can be used to categorize these and other systems is the undersampling factor U, defined as $$U = \omega_N / \omega_{DL} \qquad (1)$$

where $\omega_N$ is the Nyquist frequency of the sensor array (which depends on the pixel pitch) and $\omega_{DL}$ is the diffraction-limited frequency of the imaging optics (which depends on the operating wavelength and F/# of the imaging optics). Put in another way, undersampling factor U is proportional to the ratio of the diffraction-limited spot size to the pixel pitch.

For many consumer applications, U falls approximately in the range [0.05, 0.30]. Values of U below this range correspond to low resolution and fast F/# systems, which often are too low quality to be of considerable interest for consumer applications. Values of U above this range correspond to high resolution and slow F/#) systems, such as many microscopes or other types of high quality but expensive instruments.

For many consumer applications, sufficient performance must be achieved, but low cost and simplicity are also important factors. Thus, it is preferable that the imaging optics 110 contain a small number of elements that are easy to manufacture and assemble. A limited number of spherical lenses is generally preferred if the required performance can be achieved. Similarly, the image processing 130 preferably also is simple, sufficiently fast and low cost. Space-invariant FIR filters with fewer taps are generally preferred, subject to achieving the required performance. Thus, a digital-optical imaging system using a limited number of spherical lenses and small FIR filters is generally preferred.

In one approach, the imaging optics 110 is designed to intentionally introduce a certain amount of third order spherical aberration $W_{040}$, which is made the dominant optical aberration. The FIR filter, sampling and filter effects of the sensor array, and the MTF effects of the spherical aberration cooperate in a manner that yields near diffraction-limited performance over the frequency range of interest. The FIR filter preferably is the smallest filter that can achieve the desired performance.

In one class of digital-optical imaging systems, the imaging optics is characterized by between approximately 2 and 8 waves of third order spherical aberration $W_{040}$, and the undersampling factor U is in the range of approximately 0.05 to 0.30. The system operates in the visible.

For this class of systems, the FIR filter size is set as follows. First, assume that the FIR filter is a square N×N filter. Then the filter size N preferably is between lower bound $N_0$ and preferred upper bound $N_1$. In practice, N can be either an odd or an even number. $N_0$ is a function of the spherical aberration $W_{040}$ and undersampling factor U:

$$N_0 = \max\{3, X\} \qquad (2)$$

$$X = a_1 U^2 + a_2 W_{040}^2 + a_3 U W_{040} + b_1 U + b_2 W_{040} + c \qquad (3)$$

$$a_1 = -172.4,\ a_2 = -0.25,\ a_3 = 2.5,\ b_1 = 101.0,\ b_2 = 4.35 \text{ and } c = -18.2. \qquad (4)$$

$N_1$ is also a function of $W_{040}$ and U:

$$N_1 = 2N_0 + 1 \quad (5)$$

In many cases where spherical aberration is the dominant optical aberration (e.g., if there are more waves of third order spherical aberration than any other Seidel aberration), the intentionally large amount of spherical aberration can keep the MTF above zero for all frequencies of interest. The FIR filter then increases the contrast of these frequency components. In contrast, optical aberrations that permit the MTF to fall to zero result in frequencies at which information is lost.

Figure 2:
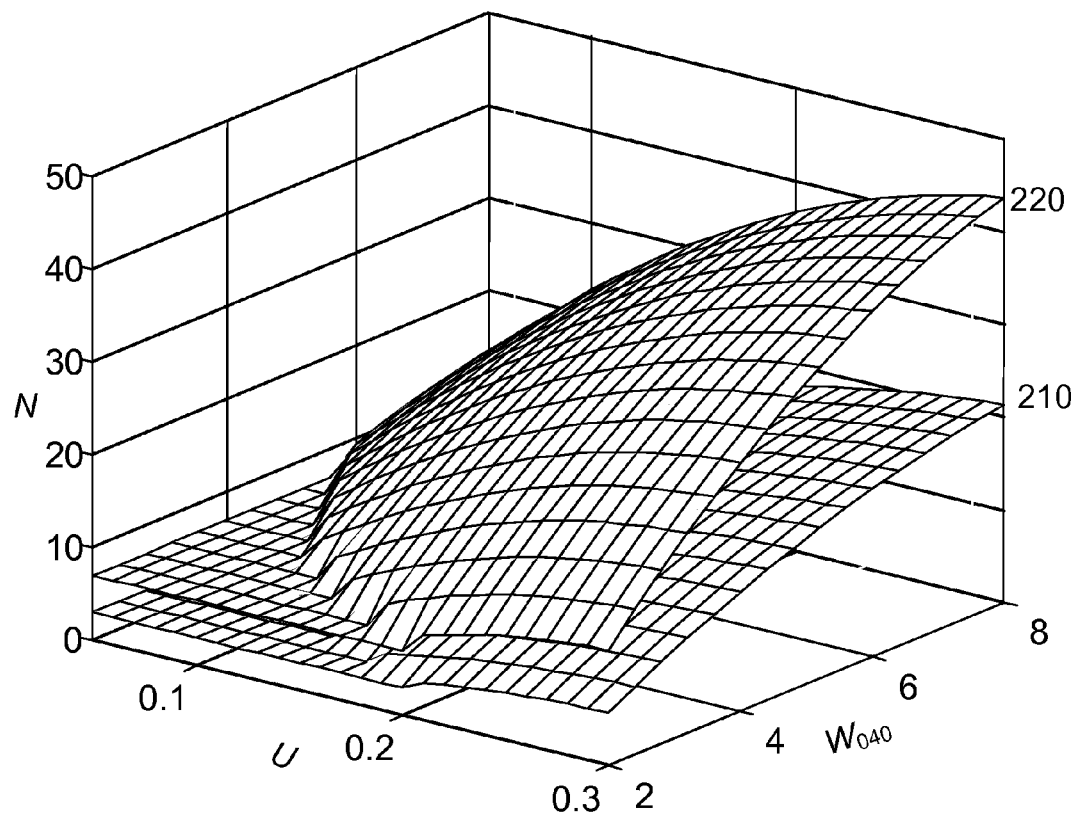
FIG. 2 is a graph plotting bounds on FIR filter size as a function of spherical aberration $W_{040}$ and undersampling factor U.

FIG. 2 is a graph plotting bounds on FIR filter size as a function of spherical aberration $W_{040}$ and undersampling factor U. Surface 210 plots the lower bound $N_0$ and surface 220 plots the preferred upper bound $N_1$. Other bounds can also be used. For example, in N×N square filters, the filter size N often is an odd number. Thus, lower bound $N_0$ could be formulated to be an odd number, and an alternate upper bound could be $N_0+2$ or $N_0+4$, for example.

Figure 3:
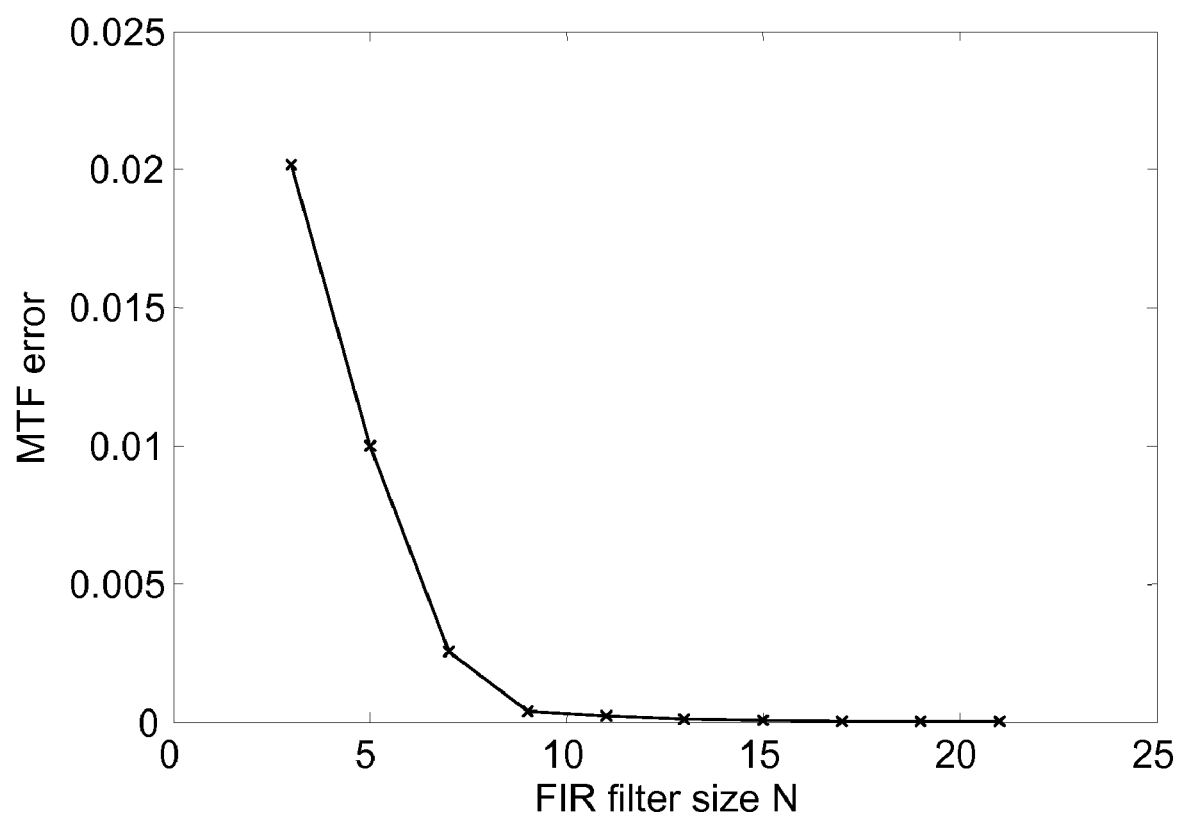
FIG. 3 is a graph plotting MTF mean square error as a function of filter size N.

FIG. 3 plots MTF mean squared error as a function of FIR filter size N for an example system. This plot is for third order spherical aberration $W_{040}$ of 5 waves and undersampling factor U=0.12. The MTF mean squared error is defined as the mean squared error based on MTF error function:

$$E_{mtf} = \int_0^1 \int_0^1 |T(\omega_1, \omega_2) - G(\omega_1, \omega_2)H(\omega_1, \omega_2)|^2 S_{uu}(\omega_1, \omega_2) d\omega_1 d\omega_2 \quad (6)$$

where G is the frequency response for the FIR filter, H is the monochromatic OTF of the imaging optics up to the Nyquist frequency in normalized spatial frequency units, and $S_{uu}$ is the power spectral density of the ideal image captured by the sensor array. The MTF error function $E_{mtf}$ is a weighted departure from an ideal MTF function denoted $T(\omega_1, \omega_2)$.

In FIG. 3, the MTF mean square error drops precipitously until about N=9, after which the MTF mean square error becomes negligible. In this example, the lower bound $N_0=8.4$ and the upper bound $N_1=17.8$. Generally speaking, we have observed that MTF mean squared error of less than approximately 0.2 percent (0.002) produce acceptable results for many consumer applications and, in many cases, is nearly indistinguishable from a situation using an ideal Wiener filter. This number is obtained by assuming the ideal image correlation coefficients are approximately 0.85 both horizontally and vertically.

Figure 4A:
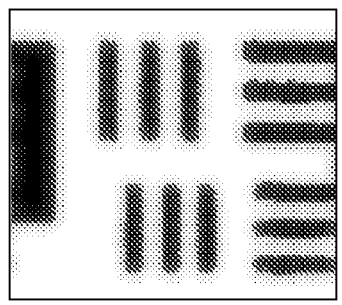
FIGS. 4A-4E are images showing the effect of increasingly larger filters.
Figure 4B:
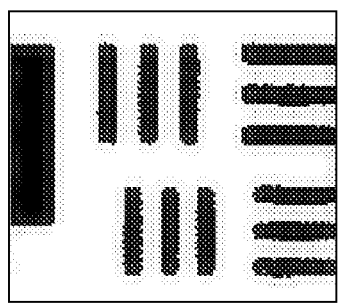
Figure 4C:
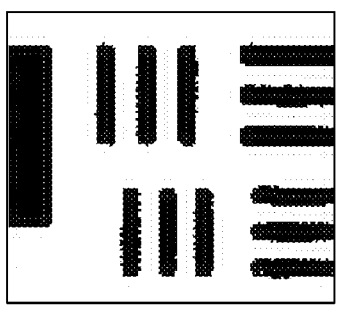
Figure 4D:
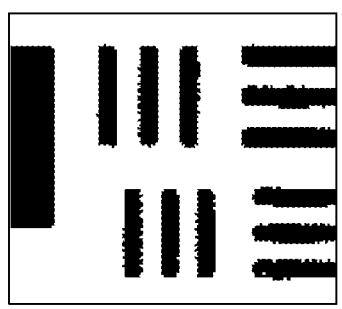
Figure 4E:
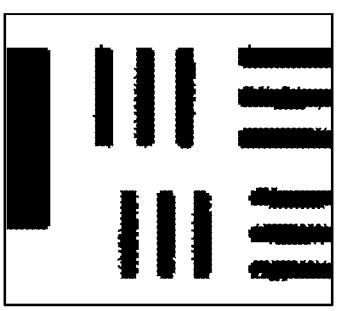

FIGS. 4A-4E are simulated images based on the example of FIG. 3. FIG. 4A shows the captured image with 5 waves of spherical aberration and no image processing. The spherical aberration produces halos around the objects. FIG. 4E shows the ideal case where the captured image has been sharpened by an ideal Wiener filter. FIGS. 4B-4D shows the images after being sharpened by 5×5, 7×7, and 9×9 FIR filters. The smaller FIR filters are unable to correct the halo artifacts due to their small sizes. The 9×9 filter achieves nearly the same performance as the ideal Wiener filter.

The lower bound $N_0$ represents a cutoff for acceptable image quality (assuming a certain desired performance level). It may vary as the acceptable image quality varies. The upper bound is not driven by acceptable mage quality since image quality will improve as the FIR filter grows in size. Rather, the upper bound is driven more by a desire to limit the size of the FIR filter. Therefore, the upper bound may vary more widely depending on the relative cost of implementing larger size filters.

In many cases, FIR filters are implemented using line buffers for each row of taps in the FIR filter. In this architecture, adding one more row is more costly than adding one more column. Thus, it may be more important to impose an upper bound on the number of rows and not so important to impose an upper bound (or to impose a higher upper bound) on the number of columns. In other words, it may be more important for the number of rows to equal the minimum number required for acceptable image quality, as opposed for the number of columns to equal the minimum number.

Non-square filters can also be used. For example, the FIR filter may be diamond-shaped. Alternately, since third order spherical aberration is rotationally symmetric and space-invariant, the FIR filter may also be rotationally symmetric and/or space-invariant.

Since spherical aberration is the dominant aberration, in many cases, the imaging optics are preferably rotationally symmetric and may consist entirely of spherical elements. This simplifies manufacture and assembly.

Figure 5:
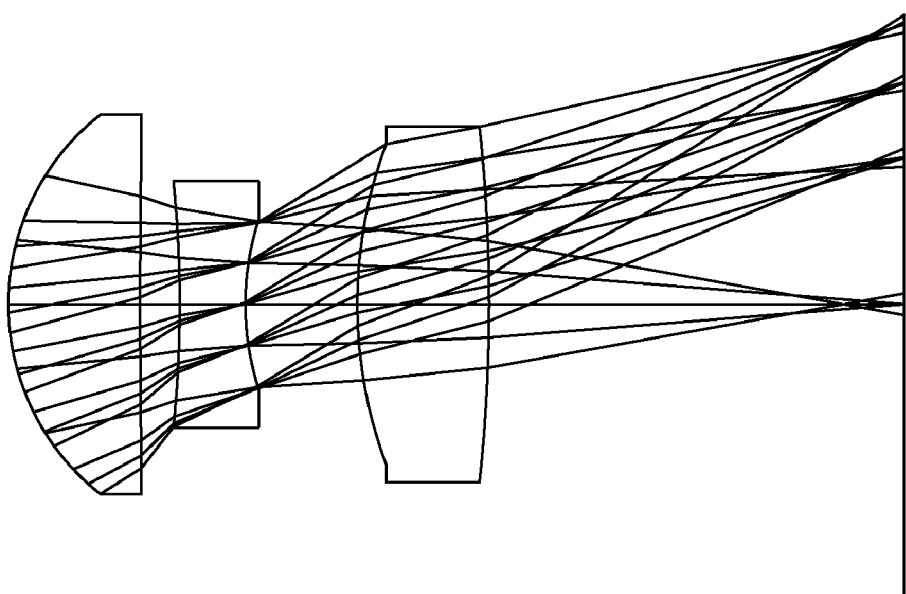
FIG. 5 is a diagram of a triplet used in an imaging system according to the invention.

FIGS. 5 and 6A-6C illustrate another example based on a triplet imaging optics and corresponding spatially-invariant FIR filtering. FIG. 5 is a diagram of the triplet. Table 1 gives the lens prescription of the triplet. In this example, the system is evaluated for a full field of view of 38 degrees, a nominal focal length of 6.3 mm, and a pixel pitch of 5 μm. The system is polychromatic, evaluated at wavelength of 0.54 μm.

TABLE 1

Lens prescription for the triplet shown in FIG. 5.

| Surface | Curvature | Thickness | Glass | Semi-Diameter |
|---|---|---|---|---|
| 0 | 0.00E+00 | 1.00E+10 |  | 0.00E+00 |
| 1 | 5.71E−01 | 1.00E+00 | BK7 | 1.40E+00 |
| 2 | 1.43E−02 | 3.00E−01 |  | 1.21E+00 |
| 3 | −1.12E−01 | 5.00E−01 | F2 | 9.10E−01 |
| 4 | 5.00E−01 | 8.50E−01 |  | 6.22E−01 |
| 5 | 3.03E−01 | 1.00E+00 | BK7 | 1.19E+00 |
| 6 | −8.33E−02 | 3.15E+00 |  | 1.31E+00 |
| 7 | 0.00E+00 | 0.00E+00 |  | 2.13E+00 |

This particular example is evaluated for three different F/#'s as shown in Table 2 below. Each column in Table 2 represents a different F/#. U is the undersampling factor, and $N_{min}$ is the minimum odd integer value based on Eqn. 2 above. Table 2 also shows the number of waves of various aberrations. Note the relative dominance of spherical aberration.

TABLE 2

Waves of aberration for the triplet shown in FIG. 5.

| | f-number | | |
|---|---|---|---|
| | F/2.7 | F/3.1 | F/3.6 |
| U (0.54 μm) | 0.147 | 0.17 | 0.192 |
| $N_{min}$ | 15 | 13 | 9 |
| spherical | 7.42 | 4.87 | 3.1 |
| coma | −0.97 | −0.7 | −0.5 |
| astigmatism | −4 | −3.2 | −2.56 |
| field curvature | 4.77 | 3.8 | 3 |
| distortion | 3.15 | 2.84 | 2.52 |

Tables 3A-3C give the filter coefficients for the F/2.7, F/3.1 and F/3.6 cases, respectively. Note that these tables only show a half quadrant of coefficients because the FIR filters are rotationally symmetric. For example, the F/2.7 case uses a 15×15 FIR filter and Table 3A shows the 8×8 filter coefficents for the upper half of the upper right quadrant of this filter. The lower left element in each table (coefficient 4.251898 in the case of Table 3A) is the origin of the full size filter.

TABLE 3A

Filter coefficients for 15 × 15 FIR filter for F/2.7.

| | | | | | | | |
|---|---|---|---|---|---|---|---|
| −0.007576 | −0.00741 | −0.00636 | −0.0093 | −0.01006 | −0.01379 | −0.00897 | −0.01521 |
| −0.002572 | −0.0028 | −0.00134 | 0.00316 | 0.005945 | 0.002231 | 0.002044 | |
| −0.009279 | −0.00996 | −0.00904 | −0.01238 | −0.00397 | −0.00229 | | |
| −0.000317 | −0.00031 | 0.000271 | −0.00373 | −0.00827 | | | |
| −0.031893 | −0.0295 | −0.01567 | −0.00379 | | | | |
| 0.004161 | 0.002941 | −0.02089 | | | | | |
| −0.32052 | −0.13651 | | | | | | |
| 4.251898 | | | | | | | |

TABLE 3B

Filter coefficients for 13 × 13 FIR filter for F/3.1

| | | | | | | |
|---|---|---|---|---|---|---|
| −0.00749 | −0.008426 | −0.00914 | −0.00357 | −0.00173 | −0.00184 | 0.009275 |
| −0.0133 | −0.010256 | −0.00651 | −0.00998 | −0.00553 | −0.00351 | |
| 0.008993 | 0.002741 | −0.00521 | −0.00761 | −0.00826 | | |
| −0.03031 | −0.016448 | 0.002224 | −0.00346 | | | |
| 0.011159 | −0.015774 | −0.02529 | | | | |
| −0.28133 | −0.073732 | | | | | |
| 3.445449 | | | | | | |

TABLE 3C

Filter coefficients for 9 × 9 FIR filter for F/3.6

| | | | | |
|---|---|---|---|---|
| −0.00329 | −0.00435 | −0.00288 | −0.000696 | 0.004042 |
| −0.02852 | −0.02231 | −0.01014 | −0.006019 | |
| 0.001295 | −0.01608 | −0.02461 | | |
| −0.18111 | −0.05048 | | | |
| 2.60645 | | | | |

Figure 6A:
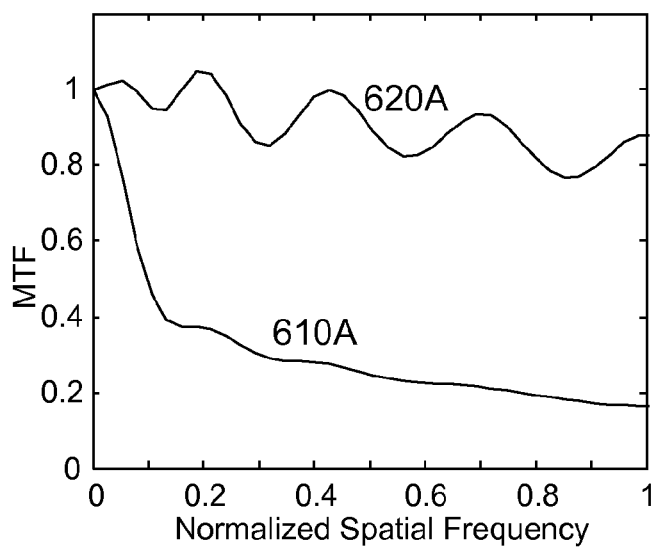
FIGS. 6A-6C are graphs of MTFs for the imaging system of FIG. 5, at three F/#'s.
Figure 6B:
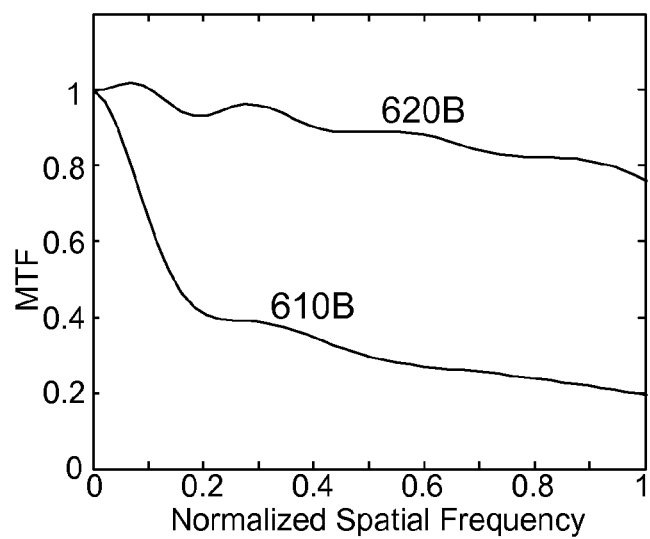
Figure 6C:
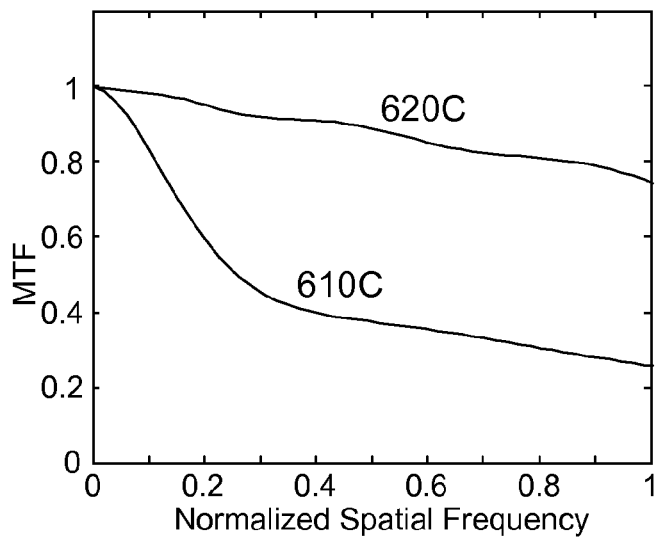

FIGS. 6A-6C show the MTFs for these three F/#'s. FIG. 6A corresponds to F/2.7, FIG. 6B to F/3.1 and FIG. 6C to F/3.6. Curve 610 in each Fig. shows the MTF of the imaging optics and sensor array but without digital filtering. Curve 620 in each Fig. shows the MTF after digital filtering, using the FIR filters shown in Tables 3A-3C above.

FIR filters are preferred because they are finite in size and do not require significant computational resources. For completeness and comparison, if given unlimited computational resources, the ideal linear restoration filter (i.e., a Wiener filter) for a digital-optical imaging system would have the spatial frequency response $$G(\omega_1, \omega_2) = \frac{H^*(\omega_1, \omega_2) S_{uu}(\omega_1, \omega_2)}{|H(\omega_1, \omega_2)|^2 S_{uu}(\omega_1, \omega_2) + S_{nn}(\omega_1, \omega_2)} \quad (7)$$

where G is the frequency response of the ideal Wiener filter, H is the monochromatic optical transfer function (OTF), $S_{uu}$ is the power spectral density (PSD) of the ideal image signal, $S_{nn}$ is the PSD of the noise added to the captured image, and $(\omega_1, \omega_2)$ are the spatial frequency coordinates. The ideal Wiener filter provides a balanced trade-off between contrast and signal-to-noise-ratio (SNR). Now assume that the additive noise PSD is flat with power $\sigma_n^2$ over the entire image. Also assume a commonly-used signal power spectral density model $$S_{uu}(\omega_1, \omega_2) = \frac{\sigma_s^2}{(1 + c_1^2 - 2c_1(1 - \omega_1^2))(1 + c_2^2 - 2c_2(1 - \omega_2^2))} \quad (8)$$

where $c_1$ and $c_2$ are image correlation coefficients and $\sigma_s^2$ is a parameter which controls the signal power. While the ideal Wiener filter has optimal performance, it also requires a very large, if not infinitely large, digital filter to implement.

As another aspect of the invention, assume that the imaging optics are dominated by third order spherical aberration and therefore has a wavefront error function that can be approximated by only two terms: a defocus term $W_{020}$ and a spherical aberration term $W_{040}$. While this ignores the other aberrations found in real optical systems, for reasonable field-of-view systems (FOV), the spherical aberration can often be made to dominate the overall system performance. Therefore, the OTF can be approximated by $$H(\omega_1,\omega_2) FFT2\{|FFT2\{M(\rho) \exp j2\pi(W_{040}\rho^4 - W_{020}\rho^2)\}|^2\} \quad (9)$$

where $M(\rho)$ is a pupil amplitude function and $\rho$ represents the pupil radial coordinates. It is this form for the OTF that is used in the examples of FIGS. 3 and 4.

The computational cost (memory, speed, circuit area) is directly proportional to the size and shape of the digital FIR filter. To reduce these hardware costs, most digital image processing systems use small FIR filters. In practice, well-designed FIR filters can achieve performance approaching that of the ideal Wiener filters under certain conditions. Such FIR filters can be designed by leveraging the Wiener-Hopf equation $$R_{vv} g = r_{uv} \quad (10)$$

where $R_{vv}$ is a N×N block symmetric Toeplitz matrix of basic dimension N×N containing the known autocorrelation values of the captured image, g is a $N^2 \times 1$ vector of the filter coefficient unknowns, and $r_{uv}$ is a $N^2 \times 1$ vector of the known cross-correlation values of the captured image and the original image. The Wiener-Hopf matrices are positive definite and therefore non-singular, yielding a unique solution to the determination of the Wiener filter coefficients.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A digital-optical imaging system comprising:
    imaging optics and a sensor array, the imaging optics positioned to produces images on the sensor array; the imaging optics characterized by between approximately 2 and 8 waves of third order spherical aberration $W_{040}$; the sensor array characterized by an undersampling factor U in the range of approximately 0.05 to 0.30 where U is the ratio of the Nyquist frequency of the sensor array divided by the diffraction-limited frequency of the imaging optics; and
    an image processor coupled to the sensor array, the image processor applying a space-invariant FIR filter to the images captured by the sensor array, the space-invariant FIR filter having at least $N_0$ rows and $N_0$ columns but not more than $N_1$ rows, where $N_0 = \max\{3, X\}$ $N_1 = 2N_0 + 1$ $X = a_1 U^2 + a_2 W_{040}^2 + a_3 U W_{040} + b_1 U + b_2 W_{040} + c$ $a_1 = -172.4$, $a_2 = -0.25$, $a_3 = 2.5$, $b_1 = 101.0$, $b_2 = 4.35$ and $c = -18.2$.

2. The digital-optical imaging system of claim 1 wherein the third order spherical aberration introduces more waves of aberration than any other Seidel aberration.

3. The digital-optical imaging system of claim 1 wherein the imaging optics are rotationally symmetric.

4. The digital-optical imaging system of claim 3 wherein the imaging optics consist of spherical lenses.

5. The digital-optical imaging system of claim 1 wherein $N_0 \geq 7$.

6. The digital-optical imaging system of claim 1 wherein $N_0 \geq 11$.

7. The digital-optical imaging system of claim 1 wherein the space-invariant FIR filter has not more than $N_1$ columns.

8. The digital-optical imaging system of claim 7 wherein the space-invariant FIR filter is a square N×N filter with $N_0 \leq N \leq N_1$.

9. The digital-optical imaging system of claim 7 wherein the space-invariant FIR filter is a diamond-shaped filter with a longest row of N taps and $N_0 \leq N \leq N_1$.

10. The digital-optical imaging system of claim 7 wherein the space-invariant FIR filter is a rotationally symmetric filter with a longest row of N taps and $N_0 \leq N \leq N_1$.

11. The digital-optical imaging system of claim 1 wherein the imaging optics has an F/# of between approximately F/2 and F/6.

12. The digital-optical imaging system of claim 1 wherein the digital-optical imaging system operates in a visible wavelength range.

13. The digital-optical imaging system of claim 1 wherein the digital-optical imaging system operates with a field of view of less than 60 degree full field.

14. The digital-optical imaging system of claim 1 wherein the sensor array has a pixel pitch of between approximately 2 μm and 9 μm.

15. The digital-optical imaging system of claim 1 wherein the digital-optical imaging system is adapted for use in a consumer device.

16. The digital-optical imaging system of claim 15 wherein the consumer device is a cell phone camera.

17. The digital-optical imaging system of claim 15 wherein the consumer device is a digital camera.

18. A digital-optical imaging system comprising:
    imaging optics and a sensor array, the imaging optics positioned to image an object onto the sensor array; the imaging optics characterized by between approximately 2 and 8 waves of third order spherical aberration $W_{040}$; the sensor array characterized by an undersampling factor U in the range of approximately 0.05 to 0.30 where U is the ratio of the Nyquist frequency of the sensor array divided by the diffraction-limited frequency of the imaging optics; and
    an image processor coupled to the sensor array, the image processor applying a space-invariant FIR filter to images captured by the sensor array, the space-invariant FIR filter large enough to reduce a mean squared error of MTF error function $E_{mtf}$ to less than approximately 0.2 percent, where $$E_{mtf} = \int_0^1 \int_0^1 |T(\omega_1, \omega_2) - G(\omega_1, \omega_2)H(\omega_1, \omega_2)|^2 S_{uu}(\omega_1, \omega_2)\, d\omega_1\, d\omega_2$$

G( ) is the frequency response for the space-invariant FIR filter,
H( ) is the OTF of the imaging optics up to the Nyquist frequency in normalized spatial frequency units,
$T(\omega_1, \omega_2)$ is a targeted OTF of the imaging optics, and
$S_{uu}$ is the power spectral density of the ideal images captured by the sensor array, where the corresponding image correlation coefficients, $c_1$ and $c_2$, are in the range of approximately 0.85 to 0.97.

19. A digital-optical imaging system comprising:
    imaging optics and a sensor array, the imaging optics positioned to image an object onto the sensor array; the imaging optics characterized by between approximately 2 and 8 waves of third order spherical aberration $W_{040}$; the sensor array characterized by an undersampling factor U in the range of approximately 0.05 to 0.30 where U is the ratio of the Nyquist frequency of the sensor array divided by the diffraction-limited frequency of the imaging optics; and
    an image processor coupled to the sensor array, the image processor applying a space-invariant FIR filter to images captured by the sensor array, the space-invariant FIR filter having at least $N_0$ rows and $N_0$ columns, where $N_0 = \max\{3, X\}$ $X = a_1 U^2 + a_2 W_{040}^2 + a_3 U W_{040} + b_1 U + b_2 W_{040} + c$ $a_1 = -172.4$, $a_2 = -0.25$, $a_3 = 2.5$, $b_1 = 101.0$, $b_2 = 4.35$ and $c = -18.2$.

20. The digital-optical imaging system of claim 19 wherein the space-invariant FIR filter is a square N×N filter with $N_0 \leq N$.

* * * * *